D. S. KEITH.
ADJUSTABLE TRELLIS FOR VINES.
APPLICATION FILED AUG. 21, 1912.
1,048,079. Patented Dec. 24, 1912.
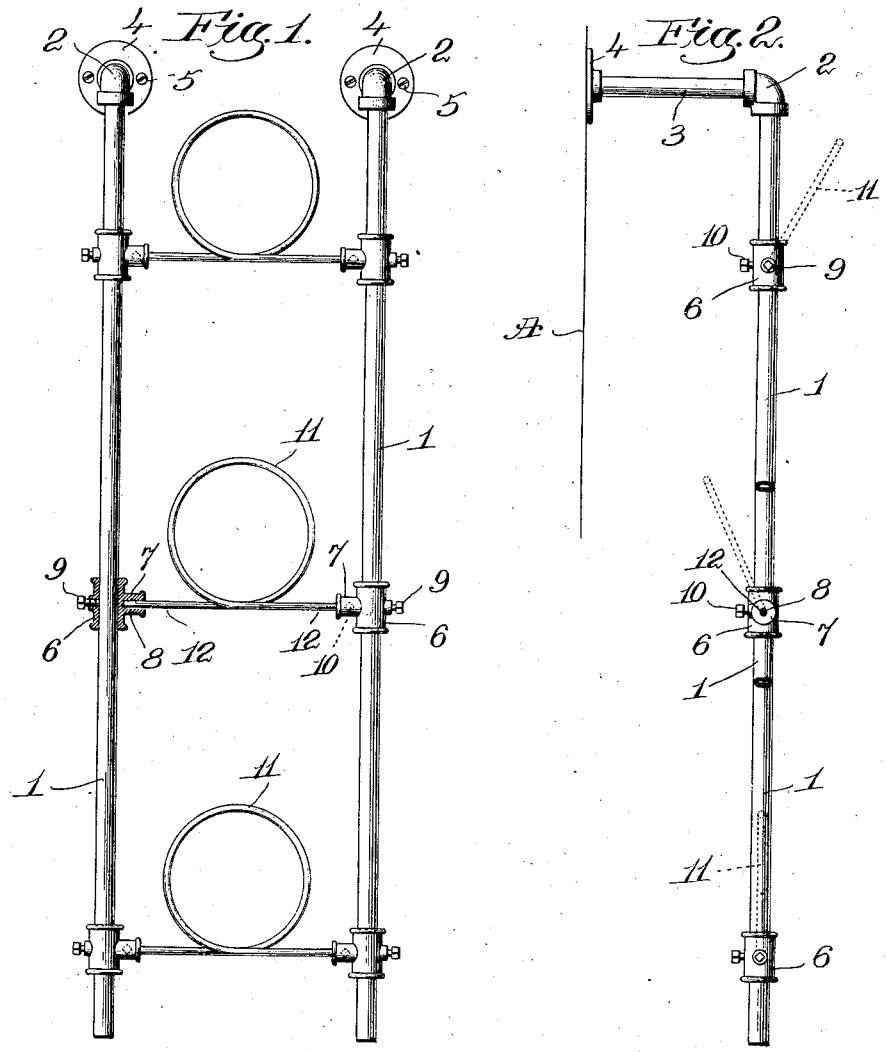

UNITED STATES PATENT OFFICE.

DARIUS S. KEITH, OF WHITMAN, MASSACHUSETTS.

ADJUSTABLE TRELLIS FOR VINES.

1,048,079. Specification of Letters Patent. Patented Dec. 24, 1912.

Application filed August 21, 1912. Serial No. 716,130.

*To all whom it may concern:*

Be it known that I, DARIUS S. KEITH, a citizen of the United States, residing at Whitman, county of Plymounth, State of Massachusetts, have invented an Improvement in Adjustable Trellises for Vines, of which the following description, in connection with the accompanying drawing, is a specification, like characters on the drawing representing like parts.

This invention has for its object the production of a simple, strong and durable trellis for rose, grape or other vines, so constructed and arranged that the trellis may be erected readily and securely, and provided with simple means for adjusting the cross-bars according to circumstances.

In accordance with my invention the trellis consists essentially of two elongated, parallel side members, a series of cross-bars between them, and means whereby said cross-bars can be adjusted longitudinally of the side members and connected detachably therewith.

The various novel features of my invention will be fully described in the subjoined specification and particularly pointed out in the following claims.

Figure 1 is a front elevation of a trellis embodying one form of my invention, with one of the carriers shown in section; Fig. 2 is a left hand side elevation thereof, partly broken out; Fig. 3 is a perspective view of the upper end or top of the trellis, showing a modified form of means for attaching the same to the house wall or other support.

Referring to Figs. 1 and 2, the trellis comprises two elongated side members 1, in practice made each of a length of iron pipe of suitable size, combining strength, light weight, and low cost, each of said members having its upper end screwed or otherwise secured in a bend 2, this bend or union having attached to it a shorter length of pipe forming an extension 3 at right angles to the part 1. Each extension has attached to its free end a disk like head 4 provided with holes for the reception of screws 5, Fig. 1, by which the upper end of the trellis is attached to the house wall or other support A, Fig. 2, the plane of the head being at right angles to the extension 3. The heads can be conveniently cast from suitable metal and having screw-threaded engagement with the extensions of the side members. Referring to Fig. 2 it will be seen that when the trellis is in place and attached to the wall of a house, to a column, or other support, said trellis is offset a distance from such support, affording ample space for free circulation of air and obviating the objectionable effects of vines grown close against wooden structures. The lower ends of the side members 1 may be inserted a few inches in the ground, or they may extend to, or only within a short distance of the surface of the ground, as may be desired. Upon each of the side members I mount a plurality of longitudinally movable carriers, each of which is herein shown as a tubular body or sleeve 6 to loosely embrace the member 1, and having a lateral boss 7 provided with a socket 8, Fig. 1. Each carrier is provided with a suitable set-screw 9 to engage the side member and clamp the carrier thereon in adjusted position, and each boss 7 is also provided with a set-screw 10 entering the socket therein. A series of cross-bars are provided to connect the side-members, and these bars may be of any suitable shape. Herein I have shown them as each comprising a substantially circular central loop 11 and oppositely extended, straight and substantially alined ends 12, made of strong wire bent to the desired shape. The opposite ends 12 of a cross-bar are inserted in the socketed bosses 7 of a pair of opposite carriers or sleeves 6, and detachably connected therewith by means of the set-screws 10, so that each cross-bar forms a transverse connection between the two side members of the trellis.

By adjusting the pairs of carriers longitudinally on the side members the cross-bars are positioned as desired, not only as to their distance apart but also as to their position relatively to the length of the side members, as will be manifest. Thus, by merely manipulating the set-screws 9 the cross-bars can be set as desired, either before or after the trellis is erected in place, and changes in the adjustment can be made at any time. By means of the set-screws 10 the cross-bars may be held in angularly adjusted position, either in an upright plane, as in Fig. 1, or in inclined planes, as shown by dotted lines, Fig. 2, giving great diversity to the scope of the trellis.

In Fig. 3 I have shown a slight modification, the extensions 3 of the side members 1 being turned toward each other and joined by a T-coupling 13, which in turn has an attached member 14 at right angles to the extensions, and the head 4 is mounted on the free end of said member 14. By this arrangement one of the attaching heads is sufficient to sustain the upper ends of a pair of side members. This construction is convenient when the trellis is to be attached to a piazza column or post, or a similar upright support, but it can also be used for attaching the trellis to a wall if desired.

It will be manifest that for purposes of transportation the trellis can be taken apart with great ease and packed in a small and compact bundle.

Various changes or modifications in details of construction and arrangement may be made by those skilled in the art without departing from the spirit and scope of my invention as set forth in the claims annexed hereto.

Having fully described my invention, what I claim as new and desire to secure by Letters Patent is:—

1. An adjustable trellis comprising elongated, parallel side members having lateral extensions at one end, an attaching head on each extension, a plurality of individually adjustable carriers slidable longitudinally on each side member, and a cross-bar between each opposite pair of carriers and having its ends detachably connected with said carriers.

2. An adjustable trellis comprising elongated and parallel tubular side members, lateral extensions connected with the upper ends thereof, a head secured permanently to said extensions to attach the trellis in place, a plurality of sleeves longitudinally slidable on each of said members, means on each sleeve to hold it in fixed position on the side member, and cross-bars each having its ends detachably connected with an opposite pair of sleeves.

3. An adjustable trellis comprising elongated and parallel tubular side members, means connected with the upper ends thereof to attach the trellis in place, said means comprising a laterally extended portion having a permanently attached head, a plurality of sleeves longitudinally slidable on each of said members, a set-screw on each sleeve to hold it in fixed position, a lateral socketed boss on each of said sleeves, a series of cross-bars having their ends seated in the bosses of pairs of opposite sleeves, and means to retain said cross-bars in the bosses, said means also coöperating with a cross-bar to maintain it in desired angular position.

In testimony whereof, I have signed my name to this specification, in the presence of two subscribing witnesses.

DARIUS S. KEITH.

Witnesses:
HARRISON D. SOULE,
GEO. D. SOULE.

---

Copies of this patent may be obtained for five cents each, by addressing the "Commissioner of Patents, Washington, D. C."